United States Patent [19]

Van Buskirk

[11] 4,081,214
[45] Mar. 28, 1978

[54] LOW ALTITUDE OPTICAL ALTIMETER

[75] Inventor: Lyman F. Van Buskirk, Ridgecrest, Calif.

[73] Assignee: The United States of America as represented by the Secretary of the Navy, Washington, D.C.

[21] Appl. No.: 702,541

[22] Filed: Jul. 6, 1976

[51] Int. Cl.² ........................... G01C 3/08; G01C 3/00
[52] U.S. Cl. ........................................... 356/4; 356/1; 358/107; 358/110
[58] Field of Search .................... 358/110, 107; 356/4, 356/1; 250/504, 372

[56] References Cited

U.S. PATENT DOCUMENTS

| 1,754,950 | 4/1930 | Henocque et al. | 250/199 |
| 3,000,256 | 9/1961 | Hyde | 356/1 |
| 3,180,205 | 4/1964 | Heppe et al. | 356/1 |
| 3,443,095 | 5/1969 | Frungel | 250/372 |
| 3,603,683 | 9/1971 | Paine | 356/4 |
| 3,610,754 | 10/1971 | Pirlet | 356/1 |
| 3,668,396 | 6/1972 | Asars et al. | 358/110 |
| 3,895,870 | 7/1975 | Cullen et al. | 356/1 |

Primary Examiner—S. C. Buczinski
Attorney, Agent, or Firm—R. S. Sciascia; Roy Miller; K. G. Pritchard

[57] ABSTRACT

A low altitude optical range finder for measuring the range from an aircraft or other vehicle to the sea, ground terrain or other object. A source of narrow beam ultraviolet light is attached at one point on the vehicle and illuminates the object. An electromagnetically deflecting image intensifier and photodiode array combination is attached to another point of the vehicle (remote from the first point) for measuring the angle of arrival of the reflected ultraviolet light and, thereby, the range to the object.

1 Claim, 6 Drawing Figures

4,081,214

LOW ALTITUDE OPTICAL ALTIMETER

BACKGROUND OF THE INVENTION

1. Field of the Invention

The invention relates to altitude determining devices and more particularly to an optical range finder which receives light reflected from a surface and produces signals indicative of the range to the surface.

2. Description of the Prior Art

In the prior art, optical range finders have employed a pair of spaced, photosensitive devices having output parameters which vary as a function of the magnitude of light reflected from an object and falling on the devices. Comparison of the parameters from each device is used to determine the angle of incidence of the reflected light and, thereby, the distance from the object to the devices. At short distances the relative sensitivity of such devices is high. At greater distances, however, the dispersion of reflected light incident upon the photodetectors is diffused, thereby lowering the sensitivity of such devices significantly.

SUMMARY OF THE INVENTION

The present invention is an altitude range finder having an ultraviolet light source and a lens system which projects the ultraviolet light as a narrow beam toward a surface. The light strikes the surface and illuminates a narrow area on the surface.

The light is reflected from the surface to a receiver having a lens which focuses the surface image onto an electro-magnetically deflected image dissection tube. The dissection tube amplifies the line image and reimages it on a phosphorous screen. A photodetector array is centrally attached to the phosphorous screen output surface for sensing the amplified ultraviolet light.

Deflection coils on the dissection tube deflect the energy periodically past the photodetector. By measuring either the driving voltage or the fractional time of sweep at the photodetector peak response, the angle of the return beam can be calculated. The range is then calculated utilizing the angle of projection, the angle of return and the distance between the projector and receiver systems.

By presetting the system to a predetermined angle of return, the measured amplitude of the deflection drive voltage can be used to control the altitude of a missile or airplane with variable lift wings.

DETAILED DESCRIPTION OF THE PREFERRED EMBODIMENT

Figure 1:
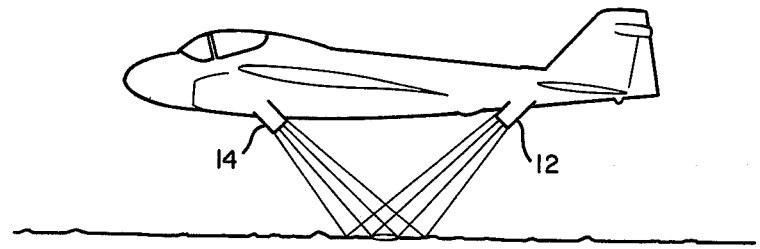
FIG. 1 shows an aircraft having the present invention mounted paralled to its longitudinal axis.

Referring to the drawings, FIG. 1 shows an aircraft having a radiation transmitter 12 attached to the lower rear portion. The radiation transmitter 12 is positioned to transmit radiation downward and forward, along the line of aircraft flight, to a distant object with a surface or to the ground surface which reflects the radiation.

A radiation receiver 14 is attached to the lower forward portion of the aircraft and is positioned to receive the radiation reflected from the ground.

Figure 2:
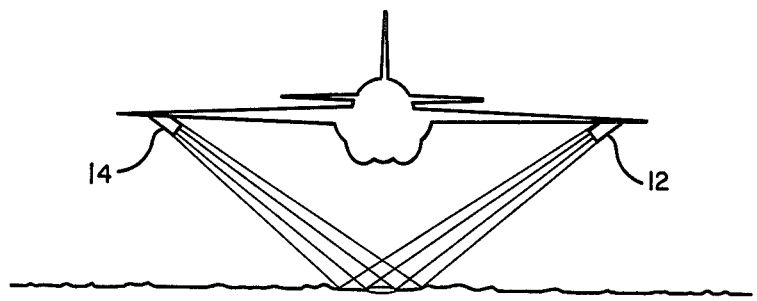
FIG. 2 shows an aircraft having the present invention mounted transverse to its longitudinal axis.

FIG. 2 shows an embodiment of the invention attached to the aircraft at the lower outer extremeties of the wings. Transmitter 12 is attached to one wing and positioned to transmit radiation downward, in a direction transverse to the line of flight of the aircraft, toward a surface. The receiver 14 is mounted on the lower extremetry of the opposite wing and is so positioned that it receives the transmitted energy reflected from the surface.

Figure 3:
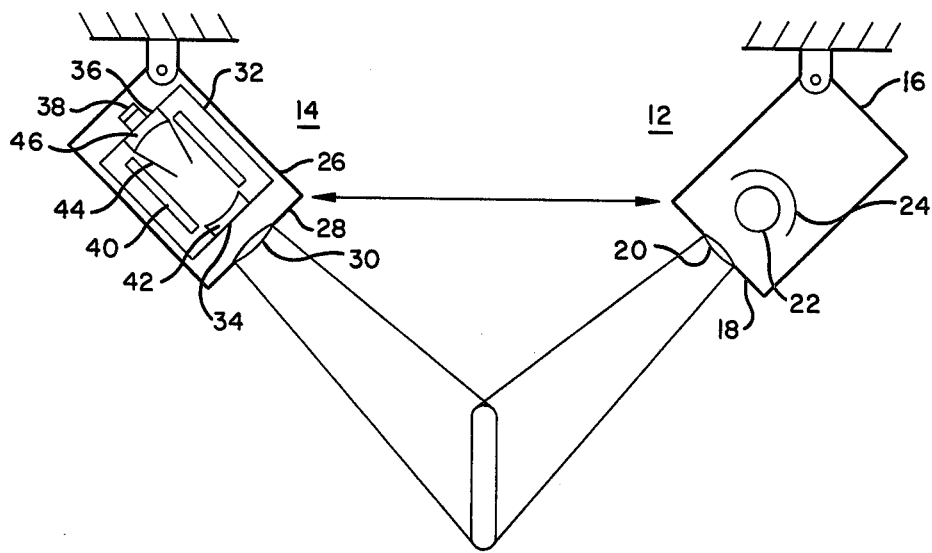
FIG. 3 is an expanded view of the invention.

Referring to FIG. 3, the transmitter 12 has a housing 16 containing a front surface 18 having a cylindrical lens 20 mounted therein. A low pressure gas discharge pencil tube 22 is contained within the housing 16 and a reflector 24 is mounted adjacent to and on the opposite side of the pencil tube 22 from the lens 20.

Receiver 14 is a housing 26 having a front surface 28 with an objective lens 30 mounted therein. An image dissection tube 32, such as a VARO 8605-1 image dissection tube, is placed within the housing 26. The image dissection tube 32 has a front input section 34 and a rear output section 36. The front input section 34 is located adjacent to and positioned to receive radiation transmitted from the objective lens 30. A line photodetector array 38, having a longitudinal and a transverse axis, is connected to the rear output section 36 of the image dissection tube 32.

The image dissection tube contains two sets of deflection coils. Only that set of coils 40 which will drive an image along the axis transverse to the photodetector array 38 is connected to a source (not shown) of periodic deflection voltage.

The image dissection tube also includes a front fiber optics face plate 42 containing the front input surface 34, an anode focusing cone 44, and a rear fiber optic face plate 46 containing a phosphorus input surface 35 and the output surface 36.

In operation, the gas discharge tube 22, a low pressure mercury (Hg) pencil tube, emits ultraviolet radiation at a wavelength of about 2560 angstroms. Ultraviolet radiation has been chosen due to the excellant signal to noise ratio in the lower atmosphere. The reflector 24 aids in focusing the radiation on the cylindrical lens 20 for transmission. The cylindrical lens 20 collimates the radiation and transmits it to a reflecting surface where a narrow line image transverse to the direction of transmission is formed. (See FIG. 3).

Figure 4:
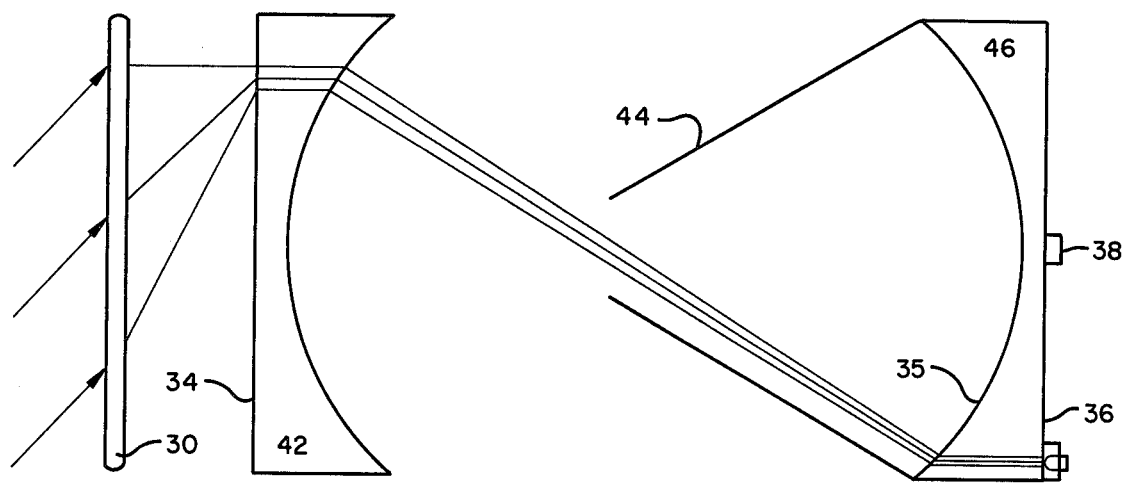
FIG. 4 is a sectional view showing operation of the receiver portion of the invention without deflection.
Figure 5:
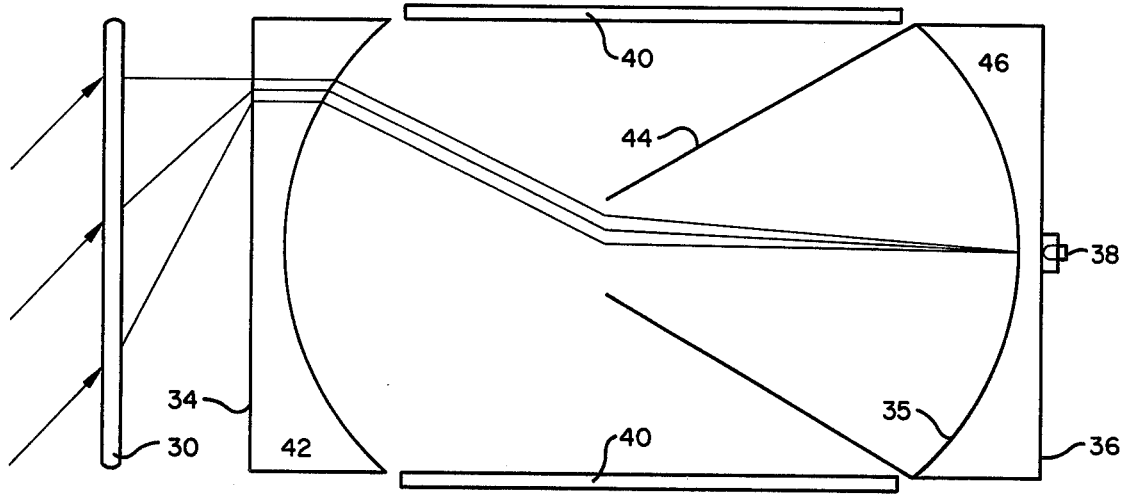
FIG. 5 is a sectional view of the receiver portion of the invention showing operation with deflection.

The line image is reflected toward the receiver, where it is received on the objective lens 30 and focused onto the input surface 34 of the fiber optics faceplate 42, as shown in FIGS. 4 and 5. A potential difference existing between the front fiber optics faceplate 42 and the focusing cone 44 causes a stream of electrons to be generated from the front fiber optics face plate 42, intensified by the cone 44 potential and focused onto the phosphorus surface 35 of the rear fiber optics faceplate 46 at a point representative of the angle at which radiation impinges on the receiver objective lens 30. The rear fiber optics faceplate 46 transmits the electrons as light through the optics faceplate 46 to the output surface 36.

Figure 6:
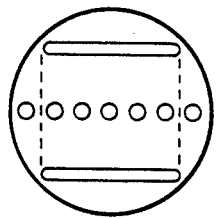
FIG. 6 is a sectional view of the phosphorous screen of the receiver section showing limits of sweep created by the deflection voltages.

In FIG. 5, the deflection plates 40 are connected to a sawtooth generator (not shown). The sawtooth wave shape applied to the deflection plates 40 causes the electron beam to sweep across the rear fiber optics faceplate 46 in the pattern shown in FIG. 6.

As the electron beam scans across the rear fiber optics faceplate 46, it crosses the photodiode array 38, causing an increase in current in the photodiode array 38 output. When the photodiode array 38 output current increases, the deflection voltage required to drive the electron beam to the position where it crosses the photodiode array 38 is measured, providing a signal representative of the position of the electron beam on the rear fiber optics faceplate 46.

As the transmitter 12 and receiver 14 are positioned a known distance apart and both are preset a known angle from the horizontal, a distance is preset into the system whereby radiation reflected at the preset distance will impinge directly on the photodector array 38 with no deflection voltage applied.

When the reflected radiation is offset from the photodetector array 38, the amplitude of the deflection voltage required to sweep the radiation image past the array 38 is measured. The deflection voltage amplitude thus measured represents the offset distance above or below the preset altitude of the system.

The altitude of the system may then be calculated by combining the signals representing the preset distance and the offset distance.

What is claimed is:

1. An optical altimeter assembly comprising:
   an ultraviolet radiation source;
   a reflector with an opening, located immediately adjacent to said radiation source so as to receive ultraviolet radiation therefrom and shaped so as to reflect said ultraviolet radiation out of said opening;
   a cylindrical lens placed in said opening so as to focus said ultraviolet radiation into a line source of ultraviolet light directed to a distant object for reflection from said distant object so as to provide a reflected line image of said line source;
   an objective lens with a focal plane, spaced apart from and in fixed relation to said cylindrical lens for receiving said reflected line image and projecting said reflected line image on said focal plane;
   an image intensifier tube configured for image dissection scanning and having an input surface, an cone, focusing cone and deflection coils, with a potential difference between said output surface and said input surface so as to emit a stream of electrons from the area of said input surface receiving said reflected line image with said electron stream passing through said focusing cone,
   said input surface lying in said focal plane,
   said image tube operative to receive and amplify and transmit said electron stream produced by said reflected line image impinging said input surface;
   said focusing cone operative to focus said electron stream to said output surface so as to produce a light output therefrom;
   a photodiode array connected to said output surface for detecting the location of said electron stream transmitted as light and so positioned that said transmitted light coincides with said photodiode array when said distant object is a preset altitude from both said cylindrical lens and said image intensifier tube;
   means connected to said deflection coils for periodically deflecting said electron stream across said output surfaces when a periodic signal is applied to said deflection means,
   said photodiode array operative to generate a peak response output when said received transmitted light coincides with said photodiode array, whereby the instant of said peak response is proportional to the altitude with respect to said preset altitude.

* * * * *